United States Patent [19]

Walling

[11] 4,345,784
[45] Aug. 24, 1982

[54] CONNECTOR ASSEMBLY FOR FLEXIBLE PRODUCTION TUBING

[76] Inventor: John B. Walling, P.O. Box 16266, Fort Worth, Tex. 76133

[21] Appl. No.: 150,615

[22] Filed: May 16, 1980

[51] Int. Cl.³ ............................................. F16L 39/02
[52] U.S. Cl. .................................... 285/39; 285/138; 285/149; 285/249; 285/297
[58] Field of Search ................. 285/149, 138, 249, 39, 285/297

[56] References Cited

U.S. PATENT DOCUMENTS

| | | | |
|---|---|---|---|
| 3,503,635 | 3/1970 | Cheatwood et al. | 285/138 |
| 3,833,754 | 9/1974 | Philibert | 285/149 X |
| 3,874,064 | 4/1975 | Chevalier | 285/149 X |
| 3,957,293 | 5/1976 | Rodgers | 285/249 X |
| 4,123,088 | 10/1978 | Tanaka | 285/149 X |

FOREIGN PATENT DOCUMENTS 559688 10/1957 Belgium .............................. 285/249

Primary Examiner—Thomas F. Callaghan
Attorney, Agent, or Firm—Dennis T. Griggs

[57] ABSTRACT

A connector assembly (30) attaches a length of flexible well production tubing (22) to a submersible pump (20). The connector assembly (30) includes a tubular housing (38) having a threaded end portion (40) defining a pin for engaging the threaded bore of the pump housing (20). A bore (46) extends axially through the connector housing for receiving an end portion of the flexible well tubing, and a counterbore (48) extends axially through the pin (40) defining a sealing chamber. Flexible strands (36) of the flexible production tubing (22) are wound about a binding element (50) which is lodged within the sealing chamber. A plug assembly (52) applies a compressive force against the binding element and against the flexible strands, thereby establishing a mechanical interconnection tie point between the flexible tubing and the connector housing. A quantity of viscous sealing material (67) is injected into the sealing chamber under pressure. The outer sidewall covering (34) of the flexible production tubing is anchored to the connector housing by a tubular, ribbed compression core (88) and a tubular wedge (90) having a tapered bore.

12 Claims, 6 Drawing Figures

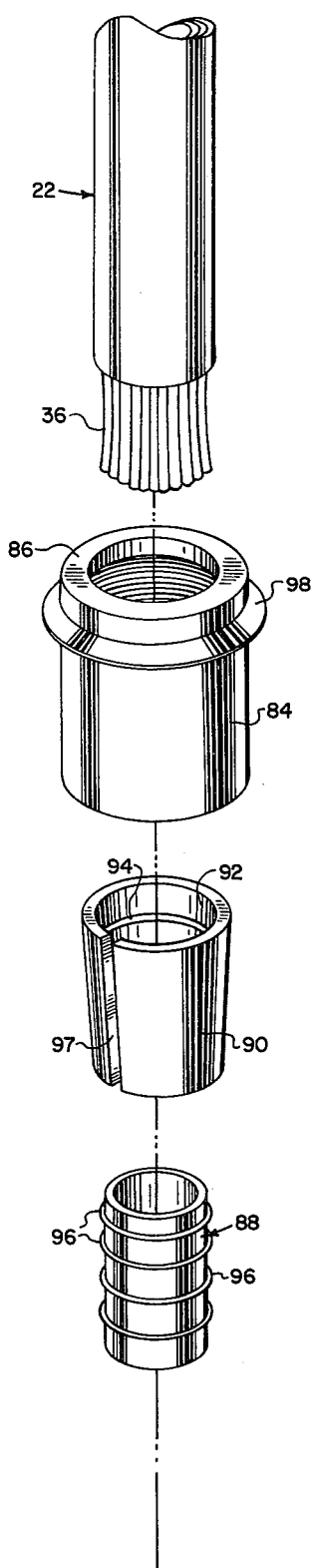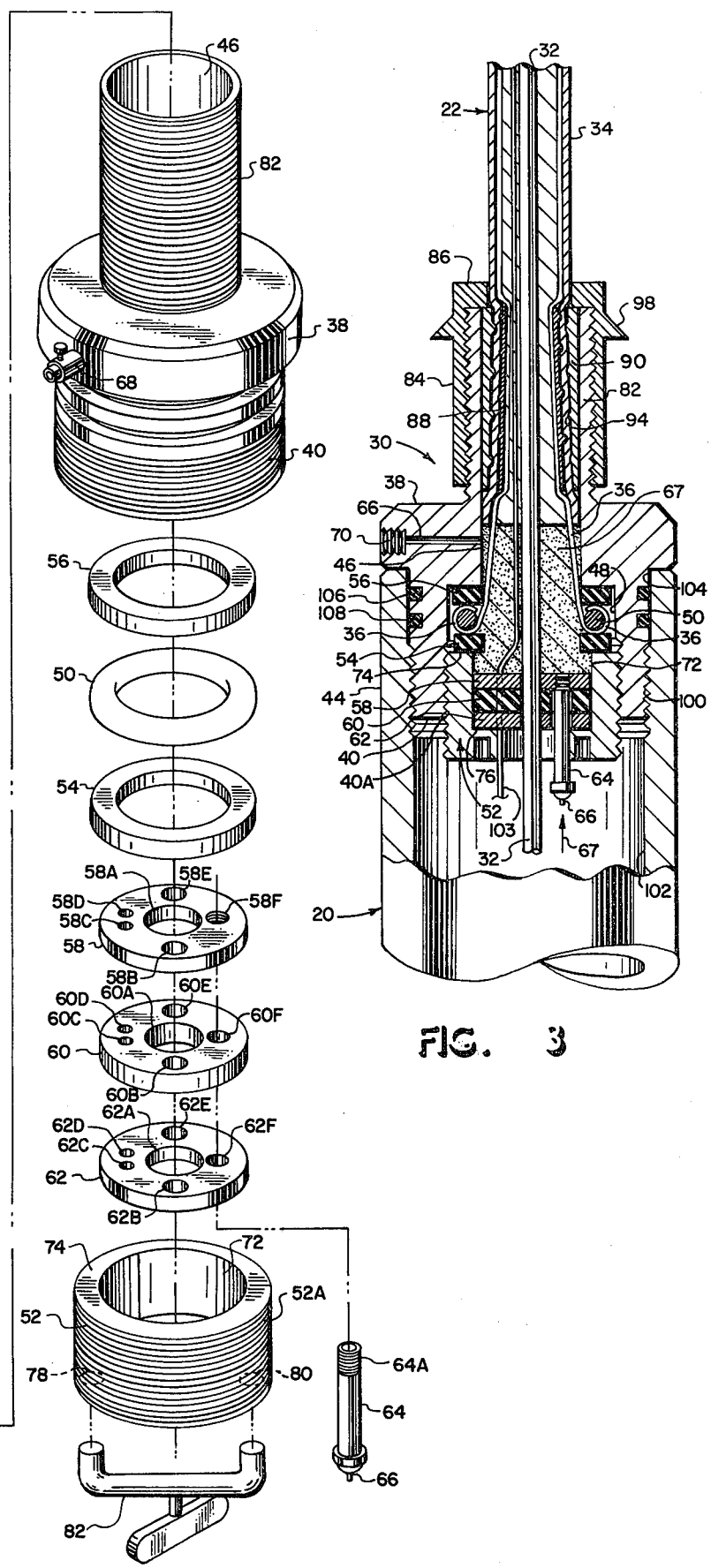
FIG. 2
FIG. 3

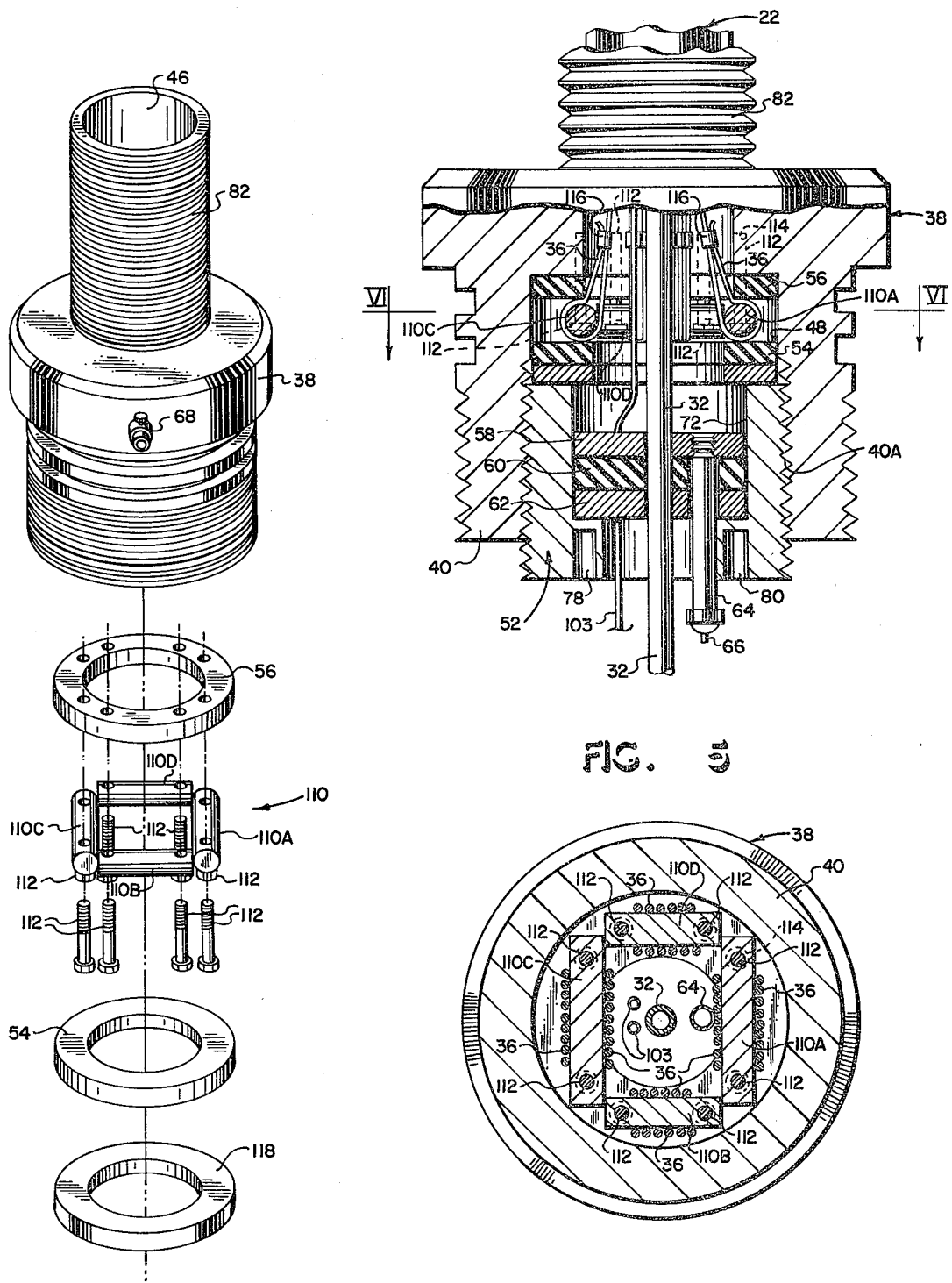

CONNECTOR ASSEMBLY FOR FLEXIBLE PRODUCTION TUBING

FIELD OF INVENTION

The present invention relates generally to well production equipment, and in particular to a connector assembly for attaching a length of flexible production tubing to a submersible pump.

DESCRIPTION OF THE PRIOR ART

Various types of artificial lifts are used to bring liquids to the surface of the earth when the pressure of the liquid-bearing reservoir is insufficient to produce the liquids by natural means. The pumping motion of the artificial lift may originate at the surface of the ground, or below as a result of the application of electrical or walking beam pivotally mounted on a Sampson post and connected at one end to the sucker rod string and at the other end to a prime mover which supplies power through a Pitman gear for producing the reciprocating motion of the sucker rod string. Generally, the prime mover consists of an internal combustion engine or electric motor. The cost of this prime mover as well as its operation and maintenance is, in many instances, a significant factor in the economics of producing liquids from subterranean liquid-bearing reservoirs. The sucker rods are characterized by a short, fast stroke, resulting in low pump efficiency, high power consumption and low recovery rates. Additionally, the steel production rod tubing is subject to failure and must be repaired or replaced from time to time.

For the foregoing reasons, there has been considerable interest in improving pumping systems in which the motive force is provided by electrical or hydraulic power applied to a subsurface pump, thereby eliminating the sucker rods and affording precise control of the pumping action.

Submersible pumps of the type in which the pumping force is derived from electrical, hydraulic, or pneumatic power applied down hole represent a significant improvement over the reciprocating sucker rod approach. According to conventional practice, the submersible pump which is driven down hole by electrical, hydraulic or pneumatic motors is supported at the end of a long string of rigid production tubing joints which are coupled to each other by pin and box connections. Such production wells must be worked over from time to time due to either faulty down hole equipment or to some other unusual or adverse well condition. For example, if the production string is damaged or leaking, it may be necessary to pull the production tubing from the casing and replace the damaged section.

When such service operations become necessary, a portable installation called a workover rig is brought to the well site and set up. Generally, these rigs consist of a heavy derrick or mast which support work pulleys or block and tackle arrangements that are operable to pull the pipe string from the well. The workover rigs are usually heavy and difficult to erect and must be able to lift the substantial load imposed by the production pipe-string.

An overriding concern in the operation of a producing well is to get the necessary equipment into and out of the well as rapidly and safely as is economically possible. The efficiency of the pipe-handling operations depends upon such factors as the running speed of the hoist rig, the time required to make up or break and tool joint during stabbing operations, the time required to mechanically couple and decouple the hoist rig and the pipe string, and the time required to transport a length of pipe from the pipe string to a storage station during recovery operations and to transport a length of pipe from the storage station to the pipe string during launching operations. As the length of the pipe string increases to reach the producing formation of deep wells, the pipe handling equipment must safely support the large load of the pipe string and permit the efficient execution of launching and recovery operations while preserving the structural integrity of the pipe string during the handling operations.

A significant advance in the well production art which eliminates the problems associated with rigid production tubing is disclosed in copending U.S. patent application Ser. No. 170,610, filed July 21, 1980, entitled "Flexible Production Tubing", which is hereby incorporated by reference. According to the disclosure of that copending application, rigid production tubing and sucker rods are totally eliminated and are replaced by flexible production tubing in which a production conduit, power conductors, signal conductors, and hydraulic/pneumatic conduits are enclosed within a flexible tubular covering. The flexible production tubing is attached directly to a submersible pump which includes driving means such as an electrical motor, hydraulic motor or pneumatic motor which is driven down hole by electrical or hydraulic/pneumatic power which is transmitted through the flexible production tubing. The flexible production tubing is wound about a reel for easy and convenient transport to and from a well site. A submersible pump is attached directly to the end of the flexible tubing and is lowered through the well casing to the producing formation. The weight of the submersible pump, which may amount to several hundred pounds, pulls the flexible tubing through the well without the requirement of snubbing. Withdrawal of the pump and flexible line from the well is easily accomplished by rewinding the flexible production tubing around the reel.

It will be appreciated that because of the weight of the submersible pump, or other equipment to which the flexible tubing is connected, that the connection of the end of the flexible tubing to the submersible pump must withstand substantial tension loading. Additionally, although it is unlikely to occur, the submersible pump can in some instances become snagged on a surface irregularity of the well casing so that the connection between the flexible tubing and the pump housing must be able to withstand substantial impulse loading as the pump is withdrawn from the well.

Because of the down hole pressures, temperatures, and the presence of corrosive formation fluids, the connection must not only be mechanically stable, but also must be sealed against leakage of the corrosive formation fluid into the pump housing and into the interconnect chamber where hydraulic/pneumatic and electrical tie connections are made.

OBJECTS OF THE INVENTION

It is, therefore, the principal object of the present invention to provide a connector assembly for attaching the end of flexible production tubing to the rigid housing of a submersible pump.

A related object of the invention is to provide a connector assembly for attaching the end of flexible production tubing to the rigid housing of a submersible pump which can withstand substantial impulse tension loading.

Yet another object of the invention is to provide a connector assembly for attaching the end of flexible production tubing to the rigid housing of a submersible pump in which the interconnection of the flexible components to the connector is completely sealed with respect to corrosive formation fluid.

SUMMARY OF THE INVENTION

The connector assembly of the invention is intended for use in combination with a flexible well production tubing of the type including a tubular outer sidewall covering, a tubular production conduit enclosed within the outer sidewall covering and a tubular sheet of flexible strands interposed between the outer sidewall covering and the production conduit.

The foregoing objects are achieved by a connector assembly which includes a tubular housing having a threaded end portion defining a pin for engaging the threaded bore of the pump housing connector box, an axially extending bore for receiving an end portion of the flexible well tubing, and a counterbore extending axially through the pin defining a sealing chamber. The end of the flexible tubing is extended through the housing bore with the flexible strands being received within the sealing chamber. A binding element is lodged within the sealing chamber and the flexible strands are wound around it. A plug assembly is lodged in the sealing chamber for applying a compressive force against the binding element and against the flexible strands which are wound around it, thereby establishing a first mechanical interconnection tie point between the flexible tubing and the connector housing.

The outer sidewall covering of the flexible production tubing is anchored to the connector housing by a tubular, ribbed compression core which is inserted between the outer sidewall covering and the tubular sheath of flexible strands, and a tubular wedge having a tapered bore for engaging the outer sidewall covering of the flexible well tubing. After the compression core and wedge have been mounted on the end of the production tubing, the assembled end is inserted into the connector housing and is driven through the connector housing bore by a closure cap having a threaded bore for engaging the threaded shank of the connector housing and an end plate having an opening through which the flexible well tubing is extended. The end plate of the closure cap is aligned with the tubular wedge for driving it through the connector housing bore as the end cap is torqued about the threaded shank. The inside diameter of the tubular wedge is preferably ribbed so that the outer sidewall covering of the production tubing is firmly and securely gripped on its inside by the ribs on the compression core and on its outside by the ribs on the tubular wedge. This establishes a second mechanical interconnection tie point between the flexible production tubing and the connector housing.

The binding element preferably comprises a ring having a curved cross section and is confined between first and second resilient bushings which prevent damage to the flexible strands which are wound about the binding element. Additional bushings are provided for sealing the tie chamber with respect to the interconnect cavity of the pump housing. According to the preferred arrangement, an injection conduit is extended through the sealing bushings and communicates with the connector tie chamber. A quantity of viscous sealing material such as epoxy is injected under pressure into the connector tie chamber, thereby completely sealing the chamber against corrosive fluids. Because the chamber is pressurized with the epoxy, after it has set it exerts a continuous mechanical force against the flexible strands, thereby establishing yet a third mechanical interconnection tie point.

According to yet another preferred embodiment, the binding element comprises a rod having a curved cross section, and preferably four rods arranged in a rectangular array. The flexible strands are divided in four groups with the strands of each group being separately wrapped around a single rod. The rods are secured by threaded fasteners into the connector housing. The rods and strands which are wound about them are compressed by resilient bushings in the manner previously discussed, and are further stabilized and sealed against corrosive fluids by injecting a viscous sealing material under pressure into the sealing chamber.

The novel features which characterize the invention are defined by the appended claims. The foregoing and other objects, advantages and features of the invention that will hereinafter appear, and for purposes of illustration of the invention, but not of limitation, exemplary embodiments of the invention are shown in the appended drawings.

BRIEF DESCRIPTION OF THE DRAWINGS

FIG. 2 is an exploded, perspective view of the connector assembly of the invention;

FIG. 3 is an elevation view, partly broken away and in section, which, illustrates the attachment of flexible production tubing to the connector assembly of FIG. 2;

FIG. 4 is an exploded, perspective view of an alternate connector assembly;

FIG. 5 is a sectional view illustrating the attachment of a flexible production tubing to the conductor assembly of FIG. 4; and, FIG. 6 is a sectional view taken along the Lines VI—VI of FIG. 5.

DESCRIPTION OF THE PREFERRED EMBODIMENTS

Figure 1:
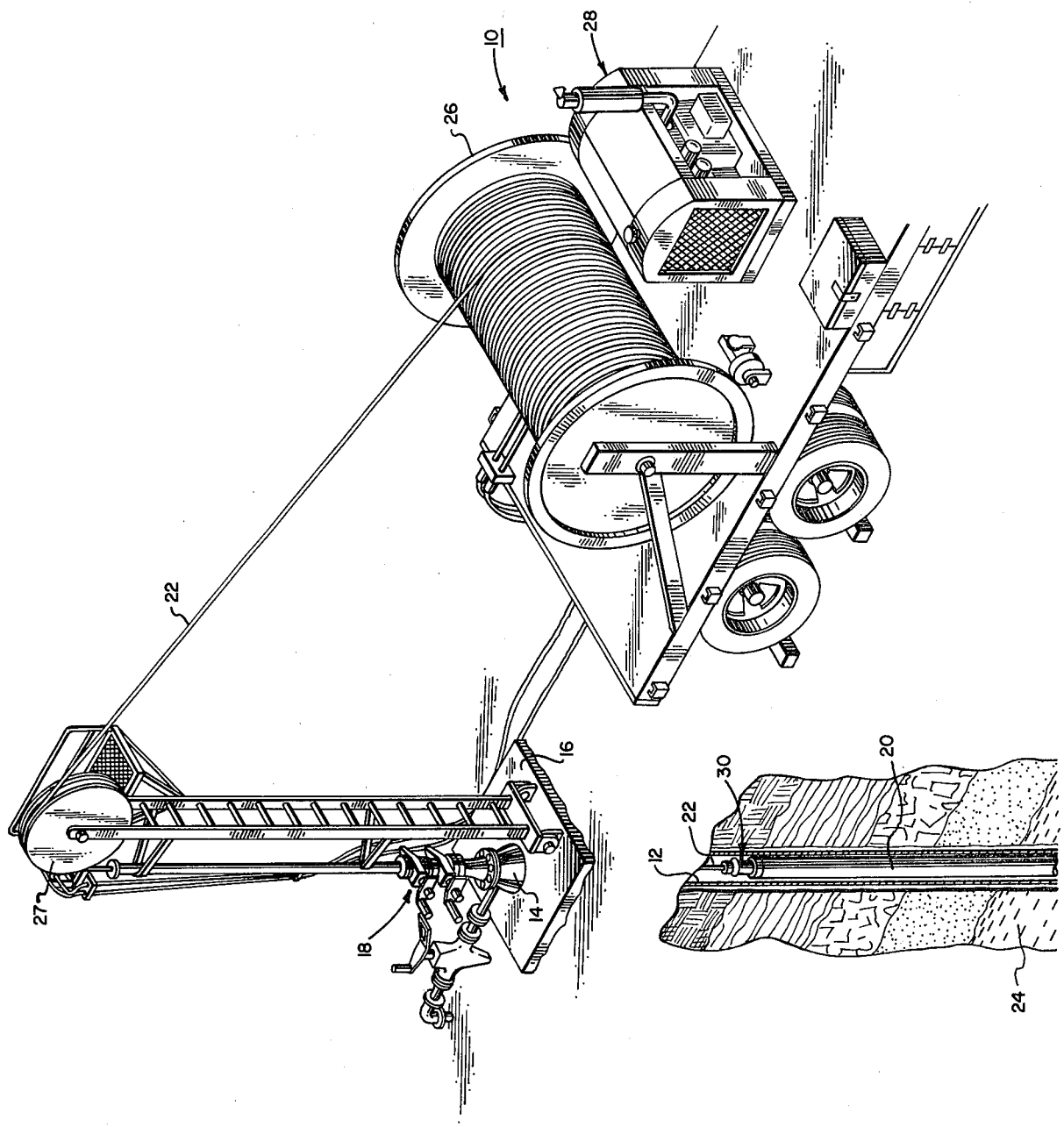
FIG. 1 is a perspective view which illustrates the installation of a submersible pump in a well bore in which the submersible pump is supported by flexible production tubing.

In the description which follows, like parts are marked throughout the specification and drawings with the same reference numerals, respectively. The drawings are not necessarily to scale and in some instances portions have been exaggerated in order to more clearly depict certain features of the invention.

Referring to FIG. 1, a pump installation rig (10) is set up adjacent a well site in which a well casing (12) is terminated by a lower well head flange (14) and is anchored in a concrete block (16) in the usual manner. A slip and packer assembly (18) extends above the lower flange (14). Extending through the slip assembly and into the bore of the well casing (12) is a submersible pump (20) which is supported by a length of flexible production tubing (22) for recovering fluids and minerals from a producing formation (24). The pump 20 is lowered and retracted through the well casing (12) as the flexible tubing (22) is played out and taken up by a reel (26) and a hydraulically powered bull wheel (27)

according to control signals generated at an operator console and power station (28).

Referring now to FIGS. 1, 2 and 3, the flexible production tubing (22) is attached to the end of the pump housing (20) by means of a connector assembly (30). As can best be seen in FIG. 3, the flexible production tubing includes a flexible production conduit (32) enclosed within a flexible, tubular outer sidewall covering (34) and a tubular sheath of flexible strands (36) interposed between the outer sidewall covering (34) and the production conduit. The connector assembly (30) includes a tubular housing (38) having a threaded end portion (40) defining a pin for engaging the threaded bore (42) of the pump housing connector box (44). Extending axially through the connector housing is a bore (46) for receiving an end portion of the flexible well tubing (22). A counterbore (48) extends axially through the pin (40) thereby defining a sealing chamber. The end of the flexible tubing (22) is extended through the housing bore (46) with the flexible strands (36) being received within the sealing chamber (48). A binding element (50) is lodged within the sealing chamber and the flexible strands (36) are wound around it. A plug assembly (52) is lodged in the sealing chamber (48) for applying a compressive force against the binding element and against the flexible strands which are wound around it, thereby establishing a first mechanical interconnection tie point between the flexible tubing and the connector housing.

The binding element (50) preferably comprises a ring having a curved cross section. The binding element (50) is confined between first and second resilient bushings (54, 56) which prevent pinching or other damage to the flexible strands which are wound about the binding element.

Additional bushings, (58, 60 and 62) are lodged in the plug assembly (52) for sealing the tie chamber (48) with respect to the interconnect cavity (64) of the pump housing (20). Bushings (58 and 62) are preferably steel spacer bushings while bushing (60) is made of a yieldable, resilient material such as rubber. Each bushing is annular in form and includes a central opening through which the production conduit (32) is extended. The central openings (58A, 60A and 62A) receive the production conduit (32) in an interference fit. Additional openings (58B, C, D, and E) receive hydraulic/pneumatic control conduits, power and signal conductors.

According to a preferred arrangement, an injection conduit (64) is extended through the sealing bushings (58, 60 and 62) through the openings (58F, 60F and 62F, respectively). The bore of the opening (58F) is threaded and is engaged by a corresponding threaded end section (64A) of the injection conduit (64). The opposite end of the injection conduit is provided with a check valve nipple fitting (66) which is suitable for high pressure duty. A quantity of viscous sealing material such as epoxy, indicated by the arrow (67), is injected under pressure into the connector sealing chamber (48), thereby completely sealing the chamber against corrosive fluids. The housing bore (46) is ventilated by a vent passage (66) which intersects the connector housing and is sealable by a valve (68). During the injection operation, epoxy sealing material (67) is injected through the injector conduit (64) and into the sealing chamber (48) until it completely fills the sealing chamber. Air is driven out of the sealing chamber and out of the connector housing bore (46) through the vent passage (66).

As the vent passage fills with epoxy, the valve (68) is manually closed off, and the chamber is pressurized to a relatively high level, for example 500 PSI. The flexible strands (36) become completely embedded within the epoxy. After the epoxy has hardened, the valve (68) is removed, and the vent is sealed with a plug (70). Because the chamber (48) is pressurized with the expoxy, after it has set, the strands (36) are anchored within the hardened mass of epoxy. The hardened epoxy exerts a continuous mechanical force against the flexible strands (36), and holds them against the side wall of the bore (46), thereby establishing another mechanical interconnection tie point between the flexible production tubing and the connector housing.

The driving force which compresses the flexible strands (36) against the binding element (50) is developed by the plug assembly (52). The plug assembly (52) is a tubular core having a threaded external side wall (52A) for threaded engagement with the threaded bore (40A) of the pin (40). The core is provided with a cavity (72) and a shoulder (74) for engaging the resilient bushing (54). The bushings (58, 60 and 62) are received within the cavity (72) and are supported on an annular retainer lip (76). As the threaded plug (52) is advanced axially through the threaded bore (40A) of the pin (40), the shoulder surface (74) compresses the resilient bushings (54, 56) and the wrapped-around ends of the flexible strands (36) into compressive engagement.

Openings (78, 80) are formed in the opposite end of the plug (52) for receiving a tightening tool (82). After the plug (52) has been torqued sufficiently, epoxy is injected under pressure into the sealing chamber (48) as previously discussed. The resilient bushing (60) carried within the cavity (72) of the plug (52) is compressed slightly as the chamber (48) is pressurized.

The binding ring (50) is preferably nylon impregnated neoprene. The flexible strands (36) preferably comprise a Kevlar fiber which is a product of Aeromid Corporation. The Kevlar fibers are relatively brittle, so that great care must be exercised to avoid pinching the fibers. Accordingly, the cross section of the binding ring (50) is preferably circular, however, other curved cross sections, such as an oval, maybe used to good advantage.

The connector housing (38) is provided with a threaded shank (82) on its upper end for receiving a closure cap (84). The closure cap (84) is provided with a threaded bore for engaging the threaded shank and an end plate (86) having a central opening through which the end of the flexible production tubing is extended. The outer sidewall covering (34) of the flexible production tubing is anchored to the connector housing by a tubular, ribbed compression core (88) which is inserted between the outer sidewall covering (34) and the tubular sheath of flexible strands (36).

Placed around the outside of the outer covering (34) is a tubular wedge (90) having a tapered bore (92) for engaging the outer sidewall covering of the flexible web tubing. After the compression core (88) and the wedge (90) have been mounted on the end of the production tubing, the assembled end is inserted into the connector housing (38) and is driven through the connector housing bore (46) by the closure cap (84) as it is torqued onto the threaded shank (82).

The end plate (86) of the closure cap is aligned with the tubular wedge (90) for driving it through the connector housing bore (46) as the end cap is tightened down. The inside diameter of the tubular wedge (90) is provided with a number of annular ribs (94) which are axially spaced with respect to each other along the length of the tapered bore (92). Similarly, annular ribs (96) are formed on the outer sidewall surface of the compression core (88) so that the sidewall covering (34) of the flexible production tubing is firmly and securely gripped on its inside by the ribs (96) on the compression core (88) and on its outside by the ribs (94) of the tubular wedge (90). This establishes a third mechanical interconnection tie point between the flexible production tubing and the connector housing.

The tubular wedge (90) preferably is provided with a slot opening (97) along the length of its sidewall whereby the sidewall can deflect radially inwardly as it undergoes compression as the end cap (84) is torqued about the threaded shank (82).

The closure cap (84) is provided with a radially projecting lip (98) for engaging a fishing tool.

The upper end of the pump assembly (20) is provided with a threaded bore (100) which defines a box for threaded engagement with the pin (40). Beneath the threaded bore (100) is an interconnect cavity (102) in which the production conduit (32) is connected to the pump by means of a swage lock connector (not shown). The remaining electrical connectors, both signal and power, are also connected to pump components in the interconnect cavity. Additionally, auxillary hydraulic/pneumatic control conduits, such as conduit (103), are also interconnected in cavity (102).

Formed above the threaded bore (100) is a smooth sealing bore surface (104) which is disposed in sealing engagement with O-ring seals (106,108) which prevent leakage of formation fluid into the interconnect cavity (102).

Referring now to FIGS. 4, 5 and 6, yet another embodiment for the binding assembly is disclosed. The binding element comprises a rectangular array (110) of rods (110A, 110B, 110C and 110D). The flexible strands (36) are divided into four groups with the strands of each group being separately wrapped around a single rod. The rods are secured by threaded fasteners (112) which are received in threaded bore openings (114) in the housing (38). The flexible strands (36) are wrapped in one or more turns around each rod, with the loose ends being secured by clamp fasteners (116). The rods and the flexible strands which are wound about them are held in compressive engagement by the resilient bushings (54, 56) which are engaged by the plug assembly (52). One or more spacer rings (118) may be interposed between the shoulder (74) of the plug assembly (52) and the resilient bushing (54) as desired. After the connector rod/strand assembly is compressed sufficiently, the sealing chamber (48) and the cavity (72) of the plug assembly are filled under pressure with epoxy.

What is claimed is:

1. A connector assembly for attaching a length of flexible well tubing to a submersible pump of the type including a housing having a connector box, the flexible well tubing including a tubular outer sidewall covering, a tubular production conduit received within the outer sidewall covering, and a tubular sheath of flexible strands interposed between the outer sidewall covering and the production conduit, said connector assembly comprising, in combination:
   a tubular connector housing having an end portion for engaging the pump housing connector box, an axially extending bore for receiving an end portion of the flexible well tubing, and a counterbore extending axially through said connector housing defining a sealing chamber;
   a binding element lodged within the sealing chamber, the binding element having a surface around which the flexible strands can be wound and having an opening through which the production conduit can be extended; and,
   an axially movable, annular plug assembly lodged within the sealing chamber for applying a compressive force against the binding element, said plug assembly having an opening through which the production conduit can be extended.

2. The connector assembly as defined in claim 1, said connector housing having a threaded shank on its opposite end, and the housing bore extending axially through said shank, the combination including:
   a tubular compression core for insertion axially into the end of the flexible well tubing between the sheath of flexible strands and the outer sidewall covering;
   a tubular wedge having a tapered bore for engaging the outer sidewall covering of the flexible well tubing, said tubular wedge being insertable into the housing bore of said shank; and
   a closure cap having a threaded bore for engaging said threaded shank and an end plate having an opening through which the flexible well tubing can be extended, said end plate being aligned with the tubular wedge for driving it through the connector housing bore as the end cap is torqued about the threaded shank.

3. The connector assembly as defined in claim 2, said tubular compression core having an elongated rib projecting radially outwardly from the exterior sidewall surface of said core.

4. The connector assembly as defined in claim 2 or claim 3, said tubular wedge having a slot opening formed along its length.

5. The connector assembly as defined in claim 2 or claim 3, said tubular wedge having an elongated rib projecting radially inwardly from its tapered bore.

6. The connector assembly as defined in claim 2, said closure cap having a radially projecting lip for engaging a fishing tool.

7. The connector assembly as defined in claim 1, said binding element comprising a ring having a curved cross section.

8. The connector assembly as defined in claim 1, including first and second yieldable annular bushings lodged in the sealing chamber on opposite sides of said binding element.

9. The connector assembly as defined in claim 1, the counterbore of said connector housing being threaded, and said plug assembly comprising:
   a tubular core having a threaded exterior sidewall for threaded engagement with the threaded counterbore, said core having a cavity and a shoulder formed on one end for transmitting a compressive force to the binding element, and having an annular retainer lip projecting radially inwardly in the cavity of said core near its opposite end;
   a yieldable, annular bushing lodged within the cavity of said tubular core and having an opening through which the production conduit can be extended; and,
   means coupled to said core for injecting a viscous sealing material into the cavity of said core.

10. The connector assembly as defined in claim 9, including first and second annular spacers lodged in the core cavity on opposite sides of said yieldable annular bushing, an injection conduit extending through the first and second spacers and yieldable bushing, and communicating with the connector sealing chamber.

11. The connector assembly as defined in claims 1, 9, or 10, said connector housing having a vent bore intersecting said connector housing and communicating with the tubing bore.

12. In combination, a length of flexible well production tubing and a connector assembly, the flexible well production tubing including a tubular outer sidewall covering, a tubular production conduit received within the outer sidewall covering, and a sheath of flexible strands interposed between the outer sidewall covering and the production conduit, said connector assembly including a tubular connector housing having an axially extending bore receiving an end portion of the flexible well tubing, and a counterbore extending axially through said connector housing defining a sealing chamber; a binding element lodged within the sealing chamber, said binding element having a surface around which the flexible strands are wound and having an opening through which the production conduit is extended; and axially movable, annular plug assembly lodged within the sealing chamber applying a compressive force against the binding element and strands, said plug assembly having an opening through which the production conduit is extended; and, an injection body of hardened sealing material occupying said sealing chamber, said flexible strands being embedded within said body of hardened sealing material.

* * * * *